Dec. 14, 1948.　　　J. A. VICTOREEN　　　2,456,094
METHOD AND APPARATUS FOR REGULATING WATER TEMPERATURE
Filed Jan. 23, 1943　　　　　　　　　　　　　5 Sheets-Sheet 1
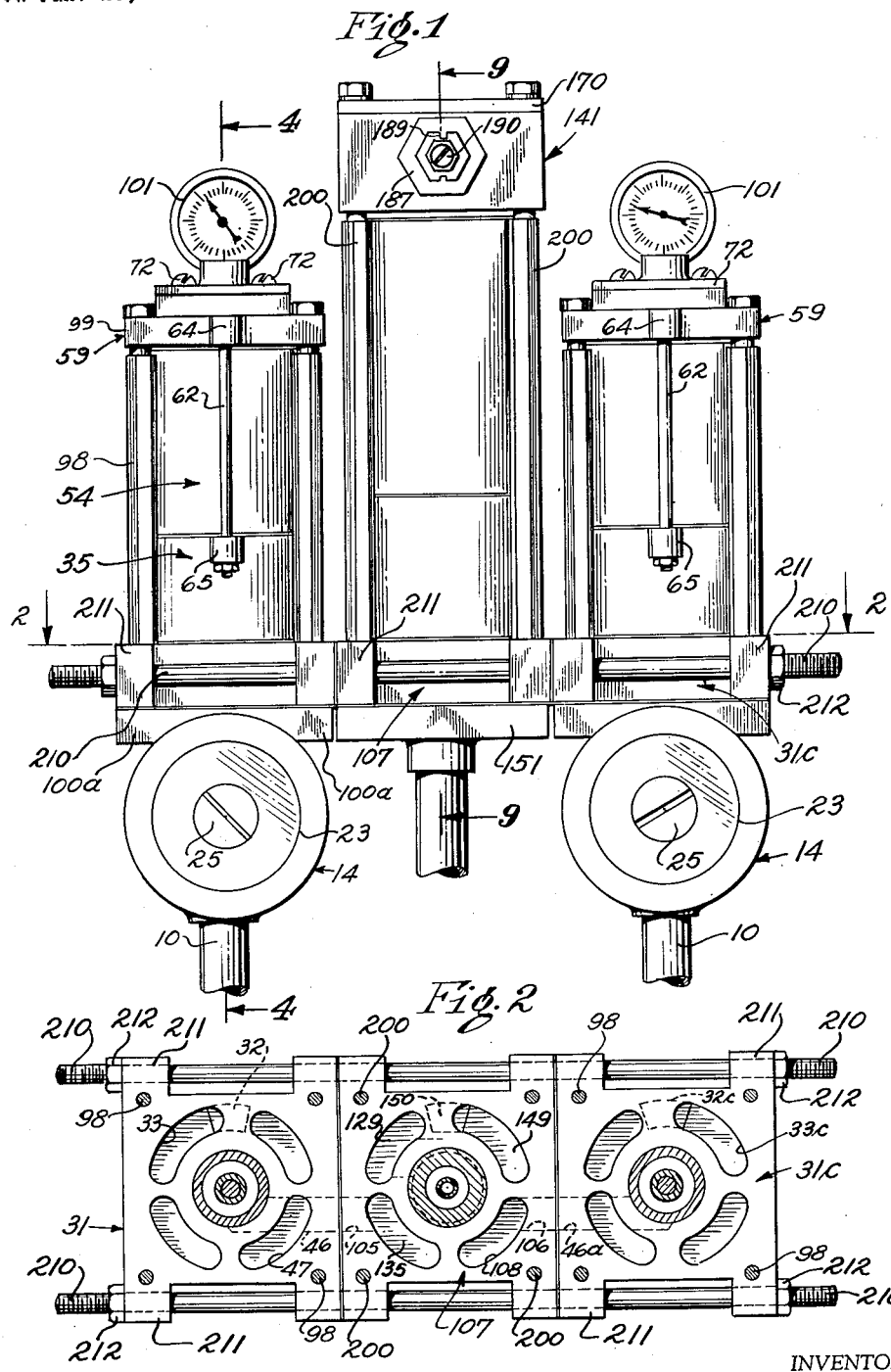
INVENTOR.
JOHN A. VICTOREEN
BY
Richey & Watts
ATTORNEYS Dec. 14, 1948.  J. A. VICTOREEN  2,456,094
METHOD AND APPARATUS FOR REGULATING WATER TEMPERATURE
Filed Jan. 23, 1943  5 Sheets-Sheet 2
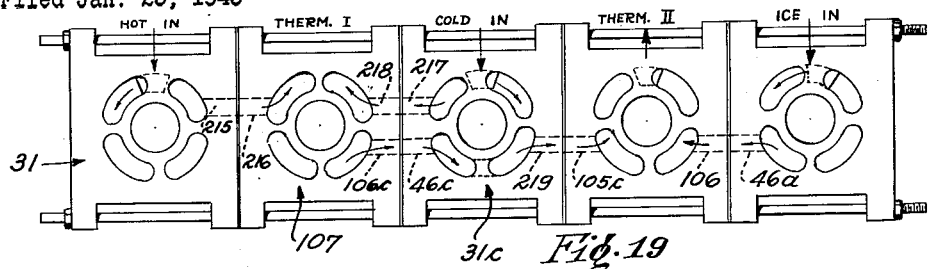
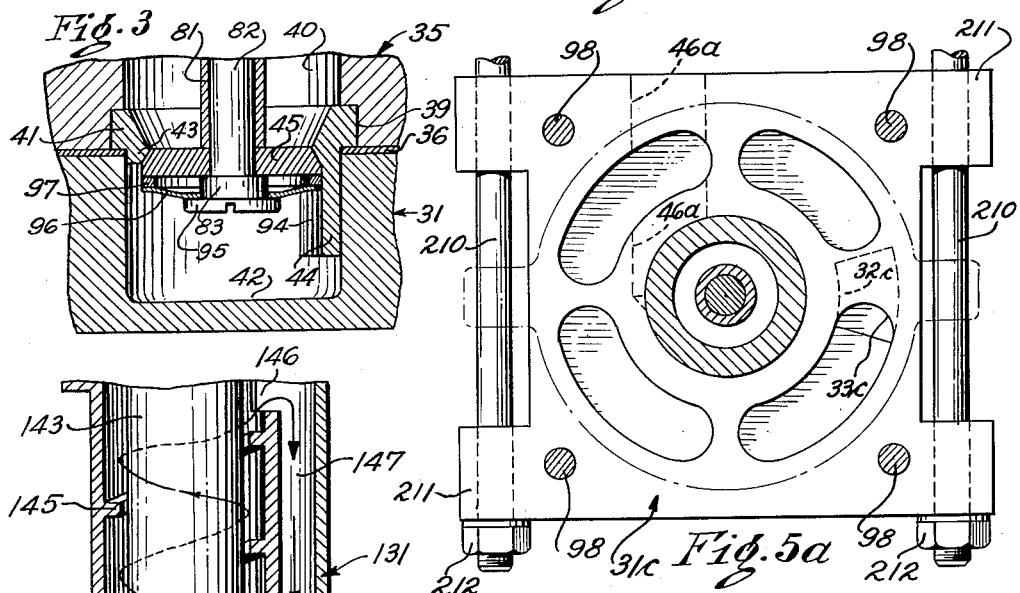
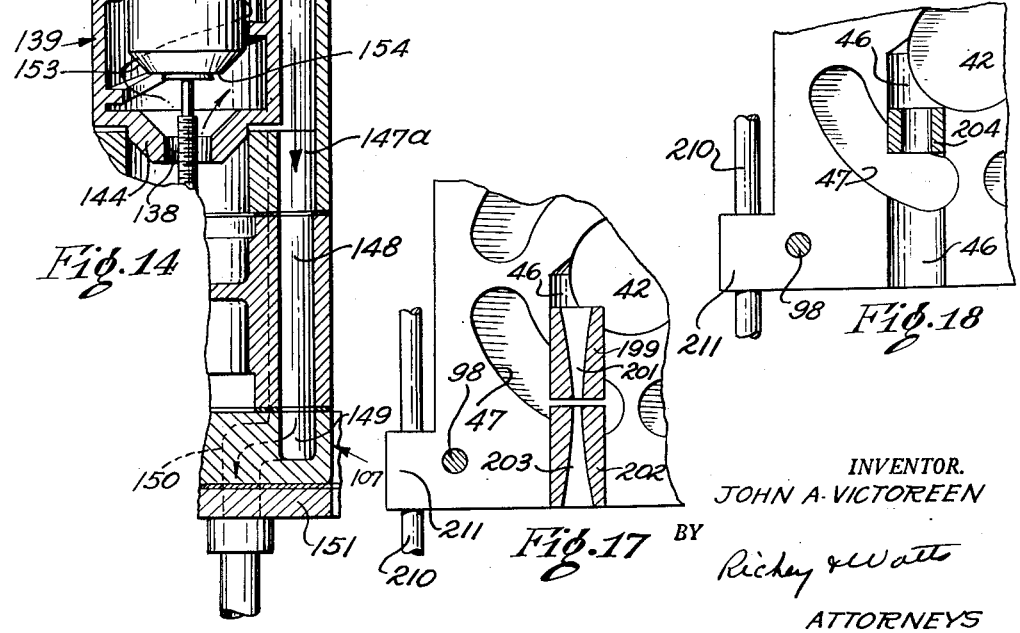
INVENTOR.
JOHN A. VICTOREEN
BY
Richey & Watts
ATTORNEYS

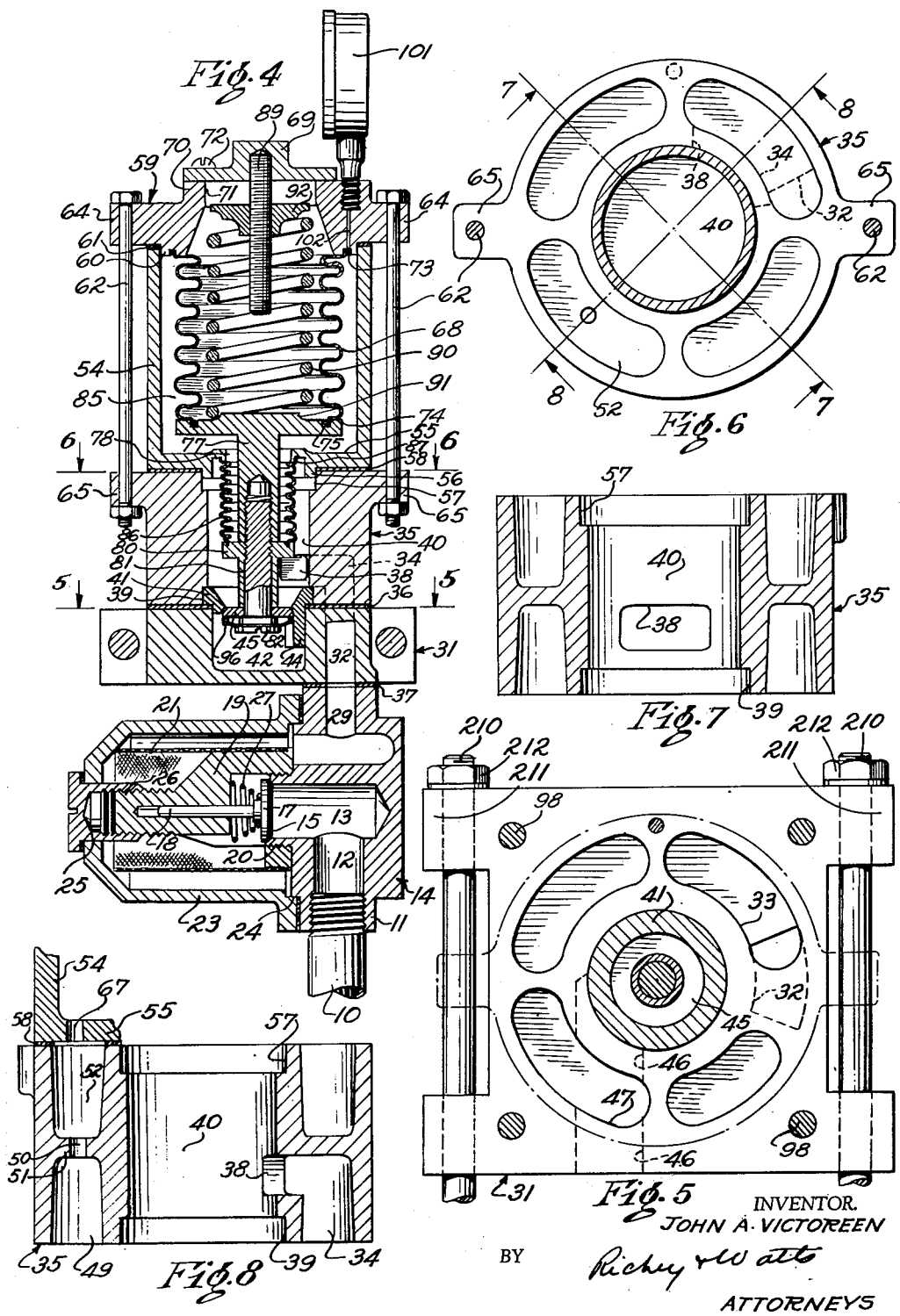

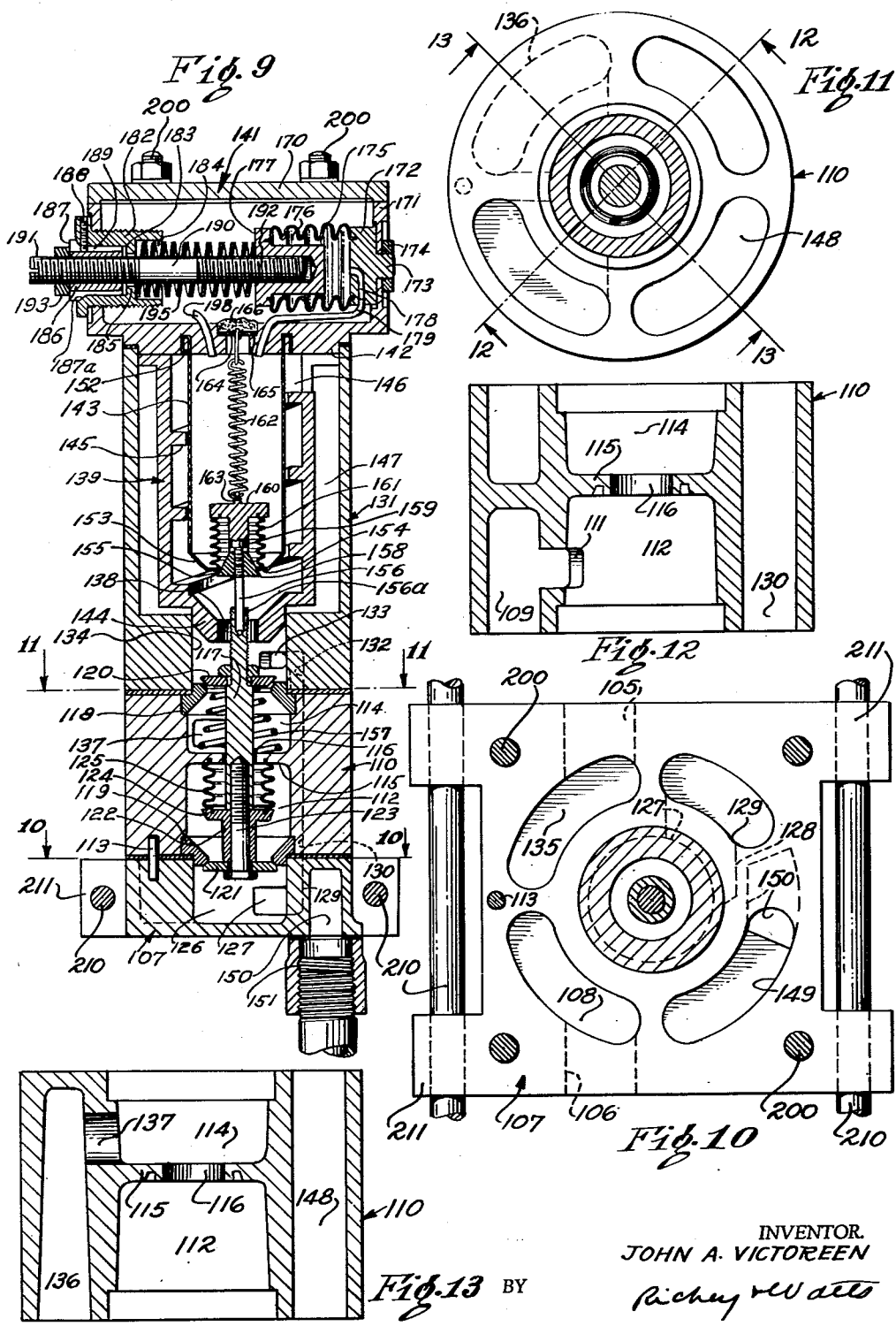

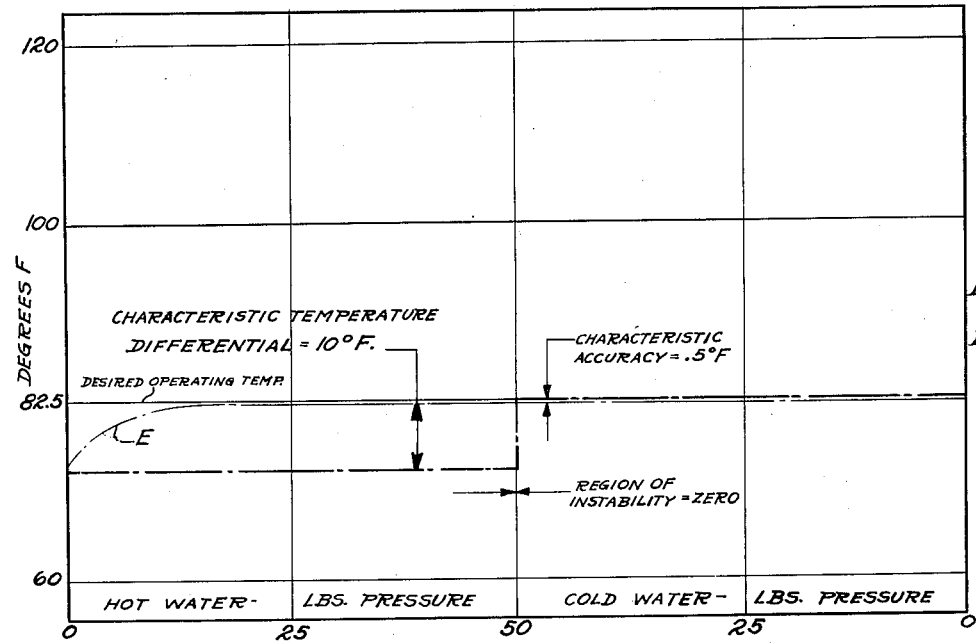
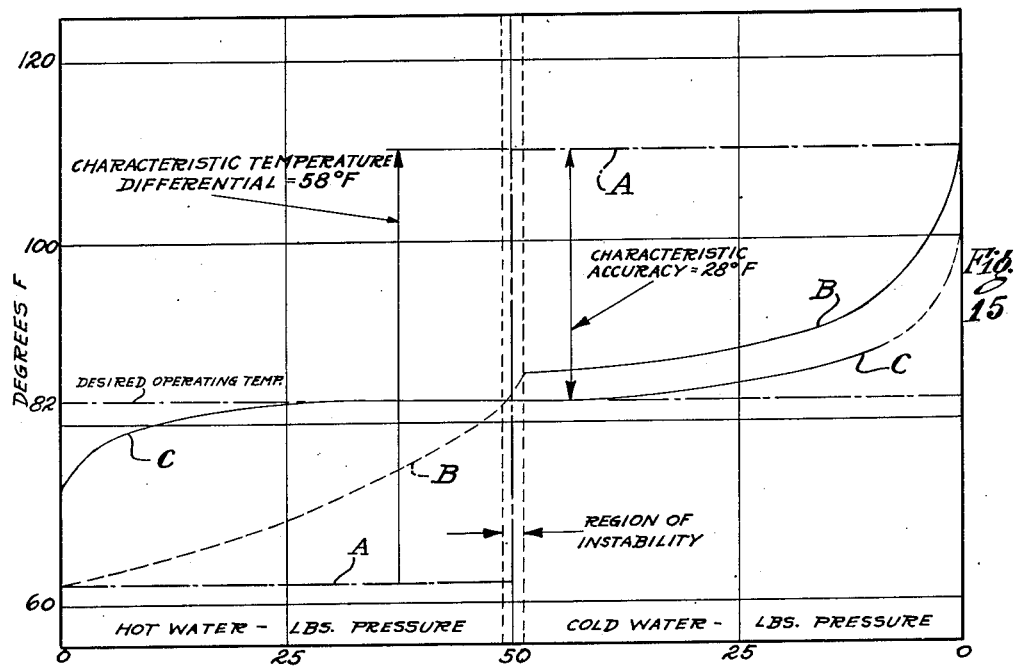

Patented Dec. 14, 1948

2,456,094

UNITED STATES PATENT OFFICE 2,456,094

METHOD AND APPARATUS FOR REGULATING WATER TEMPERATURE

John A. Victoreen, Cleveland, Ohio

Application January 23, 1943, Serial No. 473,313

4 Claims. (Cl. 236—12)

This invention relates to water temperature regulators and more particularly to a method and apparatus for controlling water temperature wherein hot and cold water supplies are mixed to provide an output supply of water at a predetermined temperature.

Regulators that mix hot and cold water and control the temperature of the water flowing are relatively well known. Such regulators are particularly useful to supply water at a predetermined temperature to control the temperature of a bath or for controlling the temperature of a fluid disposed in tanks by flowing the water thereabout. For ordinary uses there are regulators that usually provide adequate regulation where the desired temperature is not critical. There are, however, certain classes of services where even the best known regulators will not maintain the temperature within the desired range. Among those uses where accurate temperature regulation is desirable is the photographic field. It is well known in modern photography that the best results in the development of film is obtained by what is known as the time and temperature method. That is, when an exposed photographic film is immersed in a developer of a certain temperature for a predetermined time the silver image is developed to a predetermined gamma. Hence, if it is desired to have the image developed to a predetermined gamma, it becomes important to maintain the developer at a certain definite temperature. It is also desirable to have the fixing solutions for the film and the wash water for the film at the same temperature. In the case of radiographs made with Roentgen rays, it is particularly desirable to maintain the exact constant temperatures of solutions in order to obtain consistant results. Not only should the temperature of the developing solution be maintained constant but there should be no difference in the temperature between the different solutions, since changing the film from a solution of one temperature to that of another is one of the foremost promoters of what is known as graininess. It is desirable that even temperatures of solutions should be maintained during the washing of the developed film. Furthermore, the ability to keep the fluids at the desired temperature makes the process more automatic.

Uusally this temperature is maintained by immersing the developing tank in a bath of water the temperature of which is controlled, or by flowing the water through a water jacket surrounding the tank. This water must of necessity be running water and is also often used to wash the films after fixing to carry away the excess chemicals used in fixation of the silver image.

A very small change in temerature of this water (two degrees or even less) may very seriously affect the results. Consistency of results are of extreme importance in X-ray work since it is from the appearance of the final image that the final diagnosis by the physician or roentgenologist is made. If different densities or changes in graininess occur in the results it seriously complicates the ability to interpret the results of the picture and to make the final diagnosis.

Still another instance of where it is desired to maintain a certain fixed temperature is in the case of therapeutic baths.

Heretofore no regulators have been commercially available that could hold the bath at exactly the desired temperature. The closest tolerance was approximately 3 to 6 degrees either side of a set temperature. Furthermore, the accuracy of these prior devices was further affected by many elements such as the temperature of the hot and cold water supply, and the rate of discharge desired as well as the pressure of the supplies. The range of temperatures desired often affected the operation of the device, that is, a regulator that was able to keep the temperature within 2 or 3 degrees of the desired temperature at 68 degrees would not have the same accuracy at 78 degrees.

By my present invention and discovery, I have provided a regulator and a method of operating the same that will maintain an output temperature of flowing water to within less than one-half a degree either side of the desired temperature; that holds this temperature in spite of a varying rate of discharge; and that will maintain the temperature within the range for which it is constructed within reasonable limits regardless of input pressures and within reasonable limits of variation in input temperature. Of course, it is obviously impossible to supply a temperature of 68 degrees when the temperature of the normal cold water supply is above 68 degrees; but as will hereinafter appear the flexibility of the device is such that in some cases cooled or ice water may be supplied from another source and still maintain the accuracy of output regardless of the temperature of the regular cold water supply.

An ideal regualtor would be one where the desired water temperatures could be maintained with no variations in temperatures regardless of volume flow, pressure or temperature of supplies, providing, of course, that there was some pressure and as long as the respective temperatures of the hot and cold water were above and below the desired discharge temperature. I have found, however, that such extreme accuracy is not practical because attempts to construct such a regulator caused oscillation of the valves and thermostatic element which disturbs its accuracy and causes undue wear on the mechanism. But I have found that by certain improvements in construction and the application of certain discoveries, I am able to regulate the water temperature flowing from such a device consistently within .5° of the required temperature.

Prior regulators have also had various types of thermostatic control means. Some use bi-metallic elements, others use vapor pressure elements, and still others use liquid expansion elements. The present device contemplates the uses of liquid expansion thermostats for reasons which will hereinafter more clearly appear.

In general the regulator of the present invention contemplates a combination of three units, two of these units constitute pressure regulators for the hot and cold water lines and which feed the hot and cold water to the other unit which comprises the thermostatic controlled regulator where they are mixed to provide the desired output temperature.

It is therefore an object of my invention to provide an improved liquid control thermostat.

Another object of my invention is to provide an improved thermostat element which operates to provide greater accuracy of control.

Another object of the invention is to provide for an easily controlled thermostat wherein a fine degree of temperature regulation may be maintained and wherein it is possible to change the output of the device in small increments.

Another object of the invention is to provide a safety feature for a liquid thermostat where sudden surges of hot water will not cause the destruction of the thermostatic element.

Another object of the invention is to provide an adjustment for the thermostatic element which is readily accessible.

Another object of the invention is to provide a thermostatic water regulator which is quickly and easily assembled and disassembled making it possible to obtain access to the various parts.

Another object of my invention is to provide an improved method and apparatus for mixing hot and cold water.

Another object of the invention resides in providing an improved design of the various parts entering into a thermostatic water regulator which assures that all parts are easily and accurately aligned during assembly.

Another object of the invention is to provide a device of the class described wherein there are no frictionally engaged or sliding parts thus eliminating the possibility of gradual wear and resultant deterioration of efficiency and accuracy of operation.

Another object of the invention is to provide a thermostatic water regulator wherein the pressure at the output may be controlled to any desired gradient with flow.

Another object of the invention is to provide a thermostatic water regulator wherein the pressure can be increased with flow instead of decreased.

Another object of the invention is to provide an improved temperature regulator for water wherein advantage is taken of the characteristic temperature difference to overcome instability ordinarily inherent in a device of the character described due to changes in operating characteristics when pressure of hot and cold water varies one way or the other.

Another object of the invention is to provide a device of the character described where the device is assembled of units that can be interchanged and whereby the units can be assembled to build up units for different services.

Another object of the invention is to provide a thermostat using a low boiling point liquid and maintaining that liquid under pressure to raise the boiling point.

Still other objects of the invention and the invention itself will become more apparent from the following description of some embodiments thereof which description is illustrated by the accompanying drawings and forms a part of this specification.

In the drawings:

Fig. 1 is a front elevational view of the apparatus of my invention;

Fig. 2 is a plan view taken from a plane indicated by the line 2—2 of Fig. 1 and showing the relative placement of the base member of Fig. 1 but with certain parts which would otherwise be in section removed;

Fig. 3 is an enlarged fragmentary section of a valve and seat as used in the device of my invention;

Fig. 4 is a vertical medial section of the hot water pressure regulator taken from a plane on the line 4—4 of Fig. 1 with certain parts being shown in elevation;

Fig. 5 is a sectional view taken on the line 5—5 of Fig. 4 looking in the direction of the arrows and showing the hot water pressure regulator base casting in plan;

Fig. 5a is a similar view of the cold water pressure regulator base casting;

Fig. 6 is a horizontal section taken from a plane on the line 6—6 of Fig. 4 and showing the valve housing in plan view with the parts which would be in sections omitted in the interest of clarity;

Fig. 7 is a vertical section of the valve housing taken from a plane on the line 7—7 of Fig. 6;

Fig. 8 is a similar section taken from a plane on line 8—8 of Fig. 6, and showing a fragment of another housing;

Fig. 9 is a vertical medial section of the thermostat unit taken in a plane indicated by the arrows on the line 9—9 of Fig. 1;

Fig. 10 is a horizontal section taken on line 10—10 of Fig. 9 and showing a plan view of the base housing for the thermostat, certain parts being in section;

Fig. 11 is a plan view of the valve housing taken on the line 11—11 of Fig. 9;

Fig. 12 is a vertical medial section of the valve housing taken on the line 12—12 of Fig. 11, with certain parts removed;

Fig. 13 is a similar view taken on the line 13—13 of Fig. 11;

Fig. 14 is a fragmentary vertical section taken through the wall of the thermostat unit and showing the alignment of certain ducts;

Fig. 15 is a graphic representation of a set of thermostatic discharge curves for a thermostat of conventional type;

Fig. 16 is a similar graph for the device of my invention;

Figs. 17 and 18 are fragmentary sectional views of modification of my invention;

Fig. 19 is diagrammatic plan view of another modification of my invention.

Referring now to the drawings throughout which like parts have been designated by like reference characters.

Briefly the apparatus includes a combination of three units. These units comprise a pair of pressure regulator units for connection to the hot and cold water lines and which are arranged to maintain a predetermined difference of hot and cold water pressure therethrough, and they are coupled to the third unit which comprises the thermostatic regulator unit. This assembly is best illustrated in Fig. 1 with the pressure regulator units shown flanking the thermostatic unit.

As previously stated the two pressure regulator units are arranged for connection to the hot and cold water lines and these discharge hot and cold water into the thermostat unit at a predetermined pressure differential. The difference of pressure between the hot and cold water may be varied but I have found that a difference of five pounds for certain units operates very satisfactorily; that is, with the hot water being furnished at 15 pound-pressure to the thermostat and the cold water regulator furnishing cold water at 10 pound-pressure provides one satisfactory method of operation. However, it should be understood that although throughout this specification except for a modification this particular difference of pressures is used in connection with the description of the invention that it is not essential that the same pressure difference be observed. For instance, the hot water regulator unit might discharge at six pound pressure and the cold water at five pounds pressure. It is also within the purview of the invention that the cold water may have the higher pressure and the hot water the lower pressure although I have found that the most satisfactory operation is obtained with the higher pressure of hot water due to the fact that the hot water can be maintained at a higher temperature above the output temperature assuming an output temperature of around 68°.

More specifically one of the water pressure regulator units is illustrated in detail in Fig. 4. Since the hot and cold water pressure regulator units are substantially the same, a description of one should suffice. A hot water supply is connected to a check valve and screen on the lower end of the unit. The water supply conduit is illustrated at 10 being threaded into a boss 11 which is provided with a duct 12 opening into a chamber 13 in a base 14. The chamber 13 is provided with a seat 15 which is closed by a spring pressed valve 17. This valve has a stem 18 which is reciprocably journalled in a cage 19, the cage being threaded onto a boss 20 carried by the base 14. A screen 21 surrounds the cage; and a housing 23 surrounds both the screen and the cage, being seated on a shoulder 24 on the base 14. The housing is held onto the base by a hollow screw 25 which extends through the end of the housing and is threaded over a stem 26 on the end of the cage. A spring 27 is provided for closing the valve 17, being disposed about the valve stem with one end engaging the underside of the cage 19 and the other end abutting the head of the valve.

Water entering the conduit 10 passes into the chamber 13, it is assumed that it has sufficient pressure to lift the valve 17 off of its seat, after which it passes by the valve through the interstices of screen 21 into the chamber surrounding the screen and thence by way of a duct 28 upward into the base of the pressure regulator housing. The check valve prevents water from going backward into the line 10 and the screen removes any small particles of foreign matter that may be in the water.

The check valve assembly is connected to a pressure regulator base housing 31 which is provided with a duct 32, Figs. 4 and 5, that communicates with the duct 28. The duct 32 opens into an arcuate duct 33, Fig. 5, which in turn is in register with a duct 34, Fig. 8, in the valve chamber housing 35 that is seated on the base housing. Gaskets 36 and 37 are provided at points of connection between the base housing and the valve chamber housing and the check valve housing.

As can best be seen from Figs. 5, 6 and 7 the water rises in the base housing through the duct 32, travels counterclockwise in the housing in the arcuate duct 33 which lines up with the duct 34 (Fig. 8) of the valve chamber housing, then travels upward through this duct and discharges laterally through an opening 38 which extends from the arcuate duct 34 into the valve chamber 40.

The valve chamber 40 is disposed in the center of the valve housing 35 which housing is of generally cylindrical formation, the chamber itself being a cylindrical chamber extending through the housing. The bottom of the chamber is provided with a counter bore 39 (Fig. 8) in which is disposed a valve seat and guide member 41 (Fig. 4). The base of the seat member 41 extends downward at 43 into a central chamber 42 in the base housing, which chamber is of generally cylindrical formation. The valve guide is provided with a plurality of downwardly extending arcuate fingers 44, Figs. 3 and 4, which extend down alongside the chamber to a point spaced from the bottom. The water from the chamber 40 passes downward past the valve 45 into the chamber 42. A duct 46 is provided in the base casting 31 (Fig. 5) which duct opens into the chamber 42 and extends through the housing into the arcuate duct 47 and then continues through the base housing opening through the edge of the housing. This duct 46 matches up with an inlet duct on the thermostat and water passes therethrough into the base of the thermostat which will hereinafter more specifically be described. Water in the duct 47 also passes upwardly into a matching arcuate duct 49 (Fig. 8) in the valve chamber housing and thence it passes upward through an opening 50 in a partition 51 into an upper duct 52 (Figs. 8 and 6) in the valve housing.

At this point it should be noted that this valve housing as well as the base housing is so designed that the rough castings for the hot and cold water pressure regulators may be provided from the same dies and then the castings adapted for either the hot or cold water pressure regulators by drilling the proper holes at certain points. For instance, in the case of the housing illustration (Fig. 8), the ducts 49 and 52 which are separated by the partition 51. Likewise, certain of other of the equally spaced ducts are so arranged and when any particular duct is to be used it is only necessary to drill a hole in the desired partition. Also because the openings in the casting are symmetrically disposed it is possible to rotate the casting about its axis 180° to move the positions of the parts as well as the ducts all of which results in a considerable advantage as will hereinafter more clearly appear.

Seated on top of the valve housing is an upper bellows housing 54. This housing comprises a substantially cylindrical body portion and has a bottom 55 which is provided with a central boss 56 which seats in a counter bore 57 in the upper end of the valve chamber 40. A gasket 58 is provided between the bottom of the housing 54 and the upper face of the valve housing 35. The upper end of the bellows chamber is closed by a cap 59 which has an annular flange 60 extending inside of the upper edge of the bellows housing 54, a gasket 61 being provided between the edge of the casting 54 and the bottom of the cap. The cap, bellows housing and valve chamber housing are held together by bolts or threaded rods 62 which extend through ears 64 and 65 in the cap and valve chamber housing respectively.

As best shown in Fig. 8 the duct 52 is in communication with the inside of the upper bellows housing 54 by an opening 67 through the bottom wall 55 of the bellows housing; the gasket 58 being provided with an opening similar in conformation to the arcuate duct 52. Water may therefore pass upward from the duct 52 through the opening 67 into the interior of the chamber 54 where it fills the chamber around a bellows 68.

The cap 59 is provided with an upwardly extending boss 70 having a circular opening 71 extending downward therethrough into the interior of the housing (Fig. 4) and which cap is secured to the boss 70 by screws 72. The annular flange 60 on the bottom of the cap is provided with a circular groove 73 spaced from the edge of the flange and in which is secured in some suitable manner, as by soldering, the bellows 68. The bellows extends downwardly in the housing 54 to a point spaced from the bottom and carries on its lower end a base 74 of a valve support. The bellows is disposed in an annular groove 75 of the valve support and secured in a similar manner to that described for the upper end of the bellows.

The valve support 74 is provided with a stem 77 which extends downwardly into the chamber 40 through an opening 78 in the bottom 55 of the bellows housing 54 and carries on its lower end the valve assembly.

The valve assembly comprises a base 80 of a generally circular formation (Fig. 4) having a downwardly extending hollow stem 81. A valve head 45 is secured to the bottom end of the stem 81 by a screw 82 having a shoulder 83 which engages the bottom face of the valve head and is provided with a threaded stem which extends upwardly through the hollow stem 81 and is threaded into the stem 77 of the valve support. The valve chamber 40 is sealed off from the chamber 85 in the bellows housing by a smaller bellows 86 the lower end of which is secured in a groove in the base 80, being soldered therein, and the upper end of which is soldered onto a flange 87, disposed about the central opening 78 of the bottom 55 on the bellows housing 54.

It will thus been seen that the valve is supported through the chamber 40 with a head being disposed in the chamber 42 and it is suspended mainly from the bellows 68. In the Fig. 4, the valve is shown in the closed position. In actual operation it would be opened or closed depending upon the difference in pressure of the fluid in the chambers 42 and 85. The opening and closing of the valves and the resultant control of fluid pressure is determined by a spring 90 seated on a boss 91 on the upper side of the base 74 for the valve support, the spring being helical and extending upwardly and having the other end seated on an adjusting plate 92 carried by a screw 89 which is threaded into the cap 69. The tension of the spring may be adjusted by removing the screws 72, taking off the cap 69, and screwing the plate 92 down on the stem 89.

As previously stated the water gets into the chamber 85 where it exerts a pressure against the bellows 68 and particularly against the bottom side of the valve support base 74, this pressure being in an upward direction. Obviously, since the pressure in the chamber 85 is the same as the pressure in the chamber 42 should the pressure exceed a predetermined value it will cause the bellows 68 to contract carrying upward with it the valve assembly and seating the valve 45 on the seat 41. In this manner the tension of the spring determines the pressure in the outlet side of the device it being assumed, of course, that the pressure from the line is always greater than the pressure desired at the outlet of the regulator. For the purpose of this discussion it will be considered that the pressure of the line may be between thirty and fifty pounds and the pressure at the outlet will be fifteen.

The valve 45 floats because of the flexible connections. This realizes an important advantage in that the valve can be made to seat perfectly and not chatter in its operation. This advantage is effected and the guiding action of the valve is best explained by referring to Fig. 3 which is an enlarged section of the valve seat and guide member. As best shown in Fig. 3 the seat member is provided with a plurality of fingers 44 which as previously explained extend into the chamber 42 alongside the wall of the chamber. The number of these fingers may vary but I have found that three fingers operate entirely satisfactorily. The inner faces of these fingers are arcuately shaped as indicated at 94 (Fig. 3), and they are spaced from the valve head 45 so as to provide a slight clearance. The head 83 of the screw which holds the valve on the stem 77 is provided with an enlarged portion 95 upon which is supported a concavo-convex spring disc member 96. This spring engages a split annular ring 97 and holds the ring pressed against the valve head and in frictional engagement therewith, and the tension of the ring itself causes it to engage the fingers. The ring is of a size which allows it to engage the surface 94 of the fingers 44 and be guided thereby.

It will thus be seen that when the assembly is first inserted the valve may be off center relative to the seat and the ring. But the first time that the valve head 45 is seated on the seat the force of seating the valve on the seat causes the ring 97 to slide on the valve head against the pressure exerted by the spring 96, the ring being unable to move laterally because of the fingers 44 and the fingers 44 being concentric with the valve seat, the valve ring, fingers, and seats are all frictionally slid into alignment with each other, and this alignment is maintained thereafter because of the frictional engagement of the spring 96 with the ring 97 against the base of the valve 45. Thereafter the valve may lower from the seat but is always maintained in proper alignment when it closes.

The check valve unit is secured to the base housing and the entire assembly held together by bolts or rods 98 (Fig. 1) which extend through the corners 99 in the cap 59 having nuts secured on the upper end and extend through the bosses 100 of the base housing 31 and are threaded into threaded openings in laterally extending ears 100a in the check valve base as best shown in Fig. 1 and which ears are in alignment with part of the check valve assembly which engages the lower housing. The rods to the rear of the unit thus extend downward through the base casting into these ears whereas the rods to the front merely extend into and are threaded into the base casting. A pressure gauge 101 is provided, being screwed into the cap 59 and in communication with the chamber 85 by a duct 102.

As best shown in Fig. 1 and as previously described the pressure regulator extends alongside the thermostat unit. The base housing for the hot water pressure regulator unit abuts the base housing for the thermostat unit, as is best shown in Fig. 2, with the outlet pressure duct 46 of the regulator unit registering with a hot water inlet duct 105 in the thermostat unit. The cold water unit abuts the other side of the thermostat unit opposite to the hot water unit with its outlet duct in communication with the duct 106 of the thermostat unit. See also Fig. 1.

The cold water unit embodies the same construction and operation as the hot water unit. The only difference being that since it is disposed on the other side of the thermostat the parts are formed so that the outlet 46a in the base is in the opposite direction to the outlet 46 of Fig. 5, as is disclosed in Fig. 5a. This illustrates again how one casting can be constructed and by a few simple machining operations suffice for a different use.

As will hereinafter appear the adjustment of the pressure from the cold water unit provides a predetermined differential between it and the hot water unit and in one preferred method of operation provides cold water at a lower pressure to the thermostat than the hot.

The cold water outlet duct 46a connects to the duct 106 on the thermostat base (Figs. 10 and 2).

It will thus be seen that I have hot and cold water, the pressure of which is regulated so that the hot water is at higher pressure, entering the base casting 107 of the thermostat through the ducts 105 and 106 respectively.

The flow of cold water is through the duct 106 into the arcuately extending duct 108 (Fig. 10) where it then flows upward into a duct 109 of a valve housing 110 (Fig. 12) and thence laterally through a port 111 into a valve chamber 112.

The valve housing 110 comprises a generally cylindrical casting best shown in Figs. 11 and 12, and which is seated on the base casting 107. It is provided with a plurality of symmetrically disposed, arcuately shaped ducts adjacent its periphery and surrounding the control valve chambers. The ducts are designed to align with the ducts in the base casting and alignment is effected by an indexing pin 113 extending into holes in the base and valve castings.

The housing 110 contains two chambers, the lower cold water chamber 112 and an upper hot water chamber 114. The two chambers are divided from each other by a partition 115 having a central opening 116. A rod 117 extends through the opening 116 and supports the valves. The upper end of the valve chamber 115 is counterbored as best shown in Fig. 13 to receive a valve seat member 118. The lower end of the lower valve chamber 112 is likewise counterbored to receive a lower valve seat member 119.

The valve seat members each comprise a cylindrical body portion seated in said counterbore and having a tapered inner surface which flares toward the chamber and is of a reduced diameter toward the valve seat. The body is formed with a cylindrical extension of reduced diameter, the outer surface of which forms a guide for engagement with the wall of the chamber 126 for the seat 119 and the wall of the chamber 134 for the member 118. Each of the members is provided with a valve seat upon which the valves 120 and 121 are adapted to seat. It will thus be seen that the members 118 and 119 not only provide removable and easily renewable valve seats but also act as guides for holding the housings 131, 110 and 107 in proper alignment, and that they also determine the shape of the outlets for said chambers. Suitable gaskets are interposed between the housings in the same manner as described for the pressure regulator.

The rod 117 supports two valves in rigidly spaced relation to each other, an upper or hot water valve 120 adapted to seat in the seat 118 and close the chamber 114, and a lower cold water valve 121 adapted to seat on the seat 119 and close the cold water chamber 112. Because of their rigid connection they both move together and only one valve can seat at one time.

The lower valve head 121 is secured to a valve body 122, being held on a shoulder on the end of the body by a stud 123 which engages the valve head, extends through the body and is threaded into the rod 117. The body 122 is provided with an annular flange 124 into which the end of a bellows 125 is sealed, the upper end of the bellows being secured in an annular channel in the partition 115 by soldering or the like. Thus the lower valve chamber 112 is positively sealed off from the upper valve chamber 114 but the valve stem 117 is free to move through the partition within the limits of movement allowed by the clearance of the valve heads from the seats.

After the cold water enters the chamber 112 through the port 111, it may pass downward past the valve 121 (assuming it is open) into the chamber 126 disposed below the valve in the center of the base casting.

As will later appear the positions of the valves 120—121 are controlled by the thermostatic element and that opening the valve 121 or 120 allows more or less cold or hot water respectively to be admitted to the unit. From the chamber 126 the cold water passes through the port 127 into the duct 128 (Fig. 10) and thence to the arcuate duct 129 where it passes upward through the registering duct 130 in the valve casting 110 (Fig. 12). It is then conducted upward through the duct 130 into a registering duct 132 in the main thermostat housing 131 where it is discharged through a port 133 into a mixing chamber 134.

Water from the hot water pressure regulator comes into the base housing 107 through the duct 105 and thence to the arcuate duct 135 (Fig. 10), from here it then passes upward into the duct 136 (Fig. 13) in the member 110. This duct does not pass entirely through the casting but is closed off at the top as can clearly be seen in Fig. 13. The water then discharges from the duct 136 through the port 137 into the upper valve chamber 114. From the chamber 114 it may flow upward past the valve 120 into the mixing chamber 134 where it is intimately mixed with the incoming cold water from the port 133.

The manner in which the cold and hot water enter the mixing chamber assures a thorough mixing thereof after which the mixture then rises through a port 138 in a water guide 139.

This is effected because the hot water enters the chamber through the valve 120 with a spray or funnel formation and travels up along the walls of the chamber and is diverted back upon itself by the frusto-conical lower wall of the water guide. At the same time the cold water enters into the chamber transversely to the flow of the hot water all of which causes extreme turbulence and thorough mixing of the water in the chamber. It will also be noted that this chamber is very small which also assists in causing a quicker mixture of the hot and cold water.

The thermostat housing 131 which sits on top of the valve housing 110 serves to house and support the thermally responsive element which controls the opening and closing of the valves. To this end the top of the housing is closed by a thermostat regulator housing 141 which seats on the upper edge of the housing 131, a gasket being provided therebetween. A downwardly extending circular portion 142 extends into the upper end of the housing 131 a slight distance and engages the top of the water guide 139.

The water guide functions to cause the water from the mixing chamber 134 to flow in intimate contact with the thermostat tank element 143. The lower end of the guide is provided with a circular extension 144 of reduced diameter which extends into and closes the upper end of the mixing chamber. All water leaving the chamber has to go through the port 138. The interior of the guide 139 is provided with a spiral land 145 which extends from the bottom of the guide to the top. The top of the guide is provided with one or more outlets 146 through which the water may discharge into the space 147 between the water guide and housing wall after which the water travels downward to the bottom of the housing 131. Since there is only a single land this assures that all of the water from the mixing chamber is at some time or another in contact with the thermostat tank. Thus if there should be an uneven mixture of the water in the mixing chamber it still assures that all of it will contact the element and thus the mean effect of the temperature of the water is realized on the thermostat tank element.

In the bottom of the housing 131, in alignment with the space 147, there is provided an outlet duct 147a which aligns directly with the duct 148 in the valve casting 110 (Figs. 13–14). The duct 148 extends down through the casting and aligns with a duct 149 in the base which duct is in communication with the outlet 150. A coupling 151 is provided secured to the bottom housing in the same manner as previously described for the pressure regulator and into which a conduit may be screwed for conducting the water to any desired place where it may be used.

The thermostat comprises a cylindrical shell or tank 143 (Fig. 9) which is suspended from the boss 142 of the head, being seated and soldered into a circular groove 152 in a manner as best shown in Fig. 9. It then extends downward into the chamber with the wall in closely spaced relation to the land 145 of the water guide 139. The lower end of the shell is provided with a slanting wall 153 which connects the side wall with the flat extremity 154 in which is provided an opening 155.

The rod 117, which supports the valve heads in spaced relation, extends up through the port 138 in the water guide and the end of the rod is provided with a recess at 156a in which is loosely seated a small stem 156 of the thermally operated push rod. The end of the stem 156 is held firmly seated in the bottom of the recess by the upward pressure of the rod 117 which pressure is effected by a spiral valve spring 157 disposed about the stem 117, the lower end of which is in engagement with the upper surface of the partition 115 and the other end pressing against the underside of the valve head 120. The stem 156 is provided with an abutment member 158 formed as a frustum of a cone and which is threaded on the rod below the enlarged stem portion 159 of the rod. The end of the rod, inside of the tank 143 is provided with an enlarged head 160. The head is sealed to the bottom wall or end of the shell 154 by a bellows 161, one end of which is soldered or otherwise secured in an annular groove on the under side of the head 160 and the bottom end of which is soldered to the upper surface of the end wall 154. The weight of the head and its accompanying parts is taken off of the bellows 161 and the parts held in their normally upward position, without any water in the device and providing the temperature is low enough, by a helical tension spring 162 the lower end of which engages in an eye 163 on top of the head 160 and the other end of which is secured in a plate 164, seated in a counterbore 165 in the top casing 142. The plate 164 is sealed in the opening and the opening itself hermetically sealed by filling the counterbore above the plate with solder as indicated at 166.

In connection with the flow of fluid through the orifice 138 it should be noted that this flow is upward against the member 158 which is so proportioned and disposed that the pressure of the water against this member during flow compensates for the difference in flow when an increased demand for water is had upon the apparatus. That is, when the demand upon the device is the least, a back pressure occurs inside of the bellows 161 which pressure is relieved under full flow condition. This has two effects, the release of the back pressure has a tendency to lower the head 160 and at the same time the rush of water from the orifice 138 past the end of the element has a tendency to still further reduce the pressure. This is all offset by the member 158 which is so designed and placed that when the stream enters from the orifice 138 it strikes the member 158 and compensates for the reduction in pressure due to changes in flow.

As previously stated, the hot and cold water eventually reaches the mixing chamber 134 after which the mixture passes upward through the port 138 into the space around the tank 143 where it is guided upward in intimate contact therewith by the land 145. The inside of this shell is filled with a thermally expansible fluid such as ether. If the fluid is heated, it expands; if it is cooled, it contracts. Obviously upon expansion the pressure is increased and upon contracting the pressure is decreased. Also as previously stated the valve 121 controls the flow of cold water into the mixing chamber and the valve 120 controls the flow of hot water into the chamber. In the position shown in Fig. 9 the cold water valve is completely closed, and the hot water valve is open. Since they are rigidly connected together, as one opens the other closes.

Fig. 9 shows the hot water valve open, and when water is admitted, only hot water can flow and it immediately heats the tank 143 and the fluid therein causing it to expand. Pressure is exerted on the head 160 forcing it downward and causing the bellows to contract closing the hot water valve 120 and opening the cold water valve 121. The cold water then mixes with the hot and the mixture is cooled causing the head 160 to be raised due to the spring 162 and the decrease in pressure of the fluid. I have found that by this arrangement there is sufficient time lag in the operation of the thermostat to prevent quick action of the valve and prevent any hunting or oscillating action which might otherwise occur. This causes the proper mixture of hot and cold water eliminating sudden surges of hot or cold water through the device, which surges might otherwise wash all of the hot or cold water out of the chamber.

The temperature of the output of water from the device is controllable, and this control is effected by changing the pressure of the fluid in the tank 143. To this end the housing 141 is provided with a reservoir which contains a fluid, the pressure of which may be varied manually and which reservoir is connected directly to the tank element 143. This reservoir also provides a safety feature for the system whereby if at any time a sudden surge of hot water should hit the thermostat and cause the fluid to expand excessively it will not cause any damage.

As best shown in Figs. 1 and 9 the casing 141 is of substantially square formation, the upper end being closed by a cap 170. The back wall 171 supports a chamber base member 172 which is provided with a threaded stem 173 extending through the wall and secured by a nut 174 on the stem, outside of the housing. The chamber base has the end of a bellows 175 secured thereto which is soldered in a groove in the base. The other end of the bellows carries or is soldered to a piston or slug which comprises a body 176 extending into the bellows and having a flange or head 177 to which the other end of the bellows 175 is secured.

The base 172 has a duct 178 therethrough which opens to the interior of the bellows and this duct is connected by a tube 179 that leads to the interior of the chamber formed by the head 142 and tank 143. The bellows and the elements for the end thus provide a chamber which acts as a reservoir for the fluid of the thermostat element. The pressure of the fluid in the thermostat may be manually controlled by varying the capacity of the reservoir by forcing the piston or slug toward the back and collapsing the bellows. The means for effecting this operation is also effective to provide a safety feature to prevent undue expansion of fluid from bursting the chamber in the event a sudden surge of hot water contacts the thermostat as might happen should there be a failure of the cold water supply.

The means for adjusting the piston includes a bushing 182 that is threaded through an opening in the front wall of the housing. This bushing is provided with a smooth bore 183 extending from the front toward the rear end. A second bore 184 of slightly larger diameter extends from the inside end of the bushing toward the first bore, the two being separated by a partition 185. An adjusting member or nut 186 is disposed in the bore 183 being provided with a hexagonal head 187 of larger diameter than the bore and which head has a slanting portion 187a that provides a seat for seating the nut on a complementary seat surrounding the opening into the bushing. The member 187 is prevented from accidental turning in the bore 183 by a set screw 188 which is threaded through the edge of the head of the bushing 182 and extends into one of a pair of longitudinally extending kerfs 189 in the member 186. There are preferably two or more such kerfs spaced about the periphery of the body allowing for different degrees of adjustment as will later appear.

The body of the member 186 is provided with a threaded bore through which is threaded an adjusting screw 190. The screw 190 is provided with two sets of threads, one of which engages in the body 186 just described, and the other end of which is threaded into the piston or slug 176. These threads do not, however, have the same pitch since the ones at the front at 191 have twenty-seven or more threads per inch and the ones at the rear 192 have twenty-four or less threads per inch. This results in a differential adjustment for the piston by rotating the screw. The screw is provided with a slot on its outer end for the reception of a screw driver and a lock nut 193 enables it to be locked after once adjusted.

The member 186 is held seated in the bushing 182 by a helical spring 195 disposed about the screw 190 and having one end bearing against the head of the piston 177 and the other end seated in the bore 184 of the member 182.

With the above described device it enables the fluid pressure in the thermostat chamber to be adjusted. A coarse adjustment is possible by unscrewing the screw 188 from engagement in the kerf 189, after which the screw 188 and member 186 may be rotated as a unit the part 187 sliding on the seat 187a to screw the piston 176 in or out and thus distend or collapse the bellows 175, or the bushing 186 may be rotated and the screw 190 remain stationary. After the coarse adjustment is effected the screw 188 is returned to position in one of the kerfs 189 to hold the member 186 against rotation; then the lock nut 193 is loosened and the fine adjustment secured by rotating the screw 190 only; since one of the screw threads is fine and the other coarse, a fine adjustment of the piston is had with considerable rotation of the screw. After the fine adjustment is made the screw is locked with the lock nut 193. By this adjustment the pressure on the fluid may be accurately controlled and thus the operating point of the thermostat determined.

Still another feature of this particular construction is the safety feature in the event that a surge of hot water should hit the thermostat element 143. In this case the ether or other fluid might suddenly expand excessively in which case the pressure would be excessive and sufficient to destroy the tank element. However, when this occurs the fluid expands and escapes from the chamber 143 to the reservoir chamber 175 and expands that chamber the piston 172 traveling toward the front of the housing compressing the spring 195 and raising the member 186 off of its seat in the bushing 183, the screw 188 sliding in the kerf 189.

At all other times the spring 195 pushes the piston towards the back wall tending to collapse the bellows and is limited only by the screw 190 and member 186 which seats in the bushing 182.

Fluid may be introduced with the chamber of the thermostat system by means of a tube 198 which extends through the head 142 and is pinched off and soldered after the chambers are once filled.

As best shown in Fig. 1 the various elements which make up the thermostat assembly are secured together by rods 200 in a manner similar to that described in connection with the pressure regulator.

Fig. 2 also illustrates how the bases of the device line up, the units being held together in side by side relation by the rods 210 which extend through the lugs 211 and are held in place by nuts 212. The cold water base being designated as 31c and the hot water base as 31.

Although I have shown the assembly as being made up of two pressure regulators and a thermostat it will also be apparent that due to my discovery it is quite within the purview of my invention to use only one pressure regulator, this being used on the side where low pressure is desired.

It may also occur that with an increase in flow the pressure of the output of the pressure regulator may be slightly below or above the desired pressure, indicating that with increase in flow, water at this volume of flow is not supplied in the proper proportion. This might be due to the fluid friction in or through the various ducts being greater in one unit than the other. It may, therefore, be advisable to compensate one way or the other to cause a slight change in pressure with flow. I, therefore, provide means whereby the pressure regulators may increase or decrease pressure as desired. This may be incorporated in either the hot or cold water regulators or in both. That is, they can both increase or decrease pressure with flow or one can increase pressure while the other decreases as desired.

This is accomplished by a slight change or addition to one of the outlet ducts such as 46 of Fig. 5. As previously explained the discharge from the regulator of Fig. 4 to the thermostat was from the chamber 42 through the duct 46. It was mentioned that the duct 46 opens into duct 47 and then continues on through the housing discharging through the edge into the thermostat. Therefore, the duct 46 is divided by the arcuate duct 47 but the parts are in alignment with each other. In Fig. 17 I have shown a member 199 disposed in the inner portion of duct 46 which extends from the chamber 42 to or near the center line of duct 47. This member is provided with a tapered bore 201 with the smallest part of the opening being toward the end disposed in the duct 47. A similar member 202 having a similar bore 203 is disposed in the outer extremity of duct 46 the two being in opposed relation and spaced slightly apart. It will thus be seen that this constitutes a Venturi tube with the vertex disposed in the chamber or duct 47. This causes the pressure in the duct 47 to be least during the period of greater flow with the result that the decrease in pressure in the chamber 85 causes the valve 45 to open farther and thus actually increase pressure with flow.

Fig. 18 shows another mechanism for accomplishing the same results wherein the two members are replaced with a single jet 204 having an opening of reduced size since the outer opening of the duct 46 is large, there will be an aspirating or eductive effect upon water flow which causes the pressure in the duct 47 to be reduced. In the event that it is desired to decrease the pressure this can be accomplished by causing the pressure in the bellows chamber 54 to be increased. Thus, as can be readily seen, it is only necessary to place the jet 204 in the outer part of the duct 46 to cause the pressure in the duct 47 to increase rather than decrease.

In considering the operation of this device as well as others, I have discovered a new method of operation which not only applies to this but other thermostatic devices of like character. In order to afford a better understanding of the method of operation of my invention it is first essential to consider certain discoveries that I have made in connection with their operation. One of these discoveries has to do with what I term "characteristic temperature differential." This is the difference or change in temperature required to cause the thermostat to move the valves from one extreme to the other. This may also be considered as the temperature difference between the point where the cold water valve will close to shut off the cold water and where the hot water valve will close to shut off the hot water. If these points were at 62° and 110°, respectively, or 58° apart, the characteristic temperature differential would be 58°.

This is best understood by reference to Fig. 15 which shows a set of characteristic curves for a standard commercial thermostatic regulator. The ordinates are in degrees temperature and the abscissae pounds pressure. It will be seen that the degrees run from 60 to 120 and the pressure starts from 0 on the hot water side at the left and increases 50 lbs. at the center; while the cold water starts at 0 on the right and increases towards the left to 50 lbs., the center point being the place where the hot and cold water pressures are equal at 50 lbs.

The dot-dash line A depicts one phase of the operation of the thermostat where little or no flow is had in the outlet. Starting at the left with 0 lbs. hot water, the cold water is shut off because there is no hot water pressure and since the office of the device is to supply water at a predetermined temperature (in this instance 82°) it operates to close the cold water valve, since to supply any cold water without any hot water would be to supply water at a temperature below the desired value.

Under conditions of very minute or of no demand, the cold water valve remains closed until the water pressure on the hot side rises to 50 lbs. At this point, and when the cold water pressure starts to decrease and the hot water pressure is greater, the temperature in the device rises in a straight line to 110°, the cold water valve suddenly opens and the hot water valve closes and remains closed so long as the cold water pressure is less than the hot. The difference, then, between the two temperatures of 62° and 110° where the cold water valve closes and the hot water valve opens constitutes the characteristic temperature difference. This is substantially a static condition and only mentioned because this later explains certain other functions.

In actual practice when there is a flow demand this condition would not exactly obtain. However, one thing is important to observe. That is, the less volume demand on the device the more nearly the curve approaches the characteristic temperature differential curve. For instance, in curve B where the flow is restricted 1.2 gals./min. the cold water valve gradually opens with increase in hot water pressure until at or near equal pressures both valves are open approximately the same amount this being indicated by the temperature of the output which varies from 62° to approximately 85°. It should be noticed that at no time with this small flow and these differences in pressures did the temperature arrive at and stay at the desired temperature of 82° although the device had previously been stabilized at 82°. After the pressure of the hot water exceeds the cold it will be observed that the curve flattens out and then when the pressure in the cold water side decreases further to around 20 lbs. the temperature of the output suddenly rises until the point is reached where the cold water pressure is 0 and hence the hot water shuts off. Just prior to this time the temperature rose to near the upper limit of the characteristic temperature differential.

Curve C shows that for full flow of 9 gals./min. from this device much better temperature regulation is obtained. At the start the temperature is 70°, rises quickly to about 78° and at a pressure of 30 lbs. for the hot and 50 lbs. for the cold provides the desired operating temperature of 82°. This temperature is maintained until the cold water drops to 40 lbs. after which the output temperature starts to rise, the curve being substantially parallel to the curve C, thus showing that even with full flow the device has very poor regulation when there is any great change in pressure between the hot and cold water.

It should be particularly noted that at the no flow point and at equal pressures the temperature in the device may vary anywhere along the vertical part of curve A between 62° and 110°.

At this point it should also be noted that there is a zone on either side of the equal pressure points which I have termed the "region of instability." This zone is determined largely by the mechanical stability of any particular device and is one where the temperature may vary erratically. This is apparently due to mechanical friction between the parts, flow friction of water through the ducts, turbulence and other elements. The main point to be observed is that because of this region it is impossible to exactly determine or control the operation of the valves when pressures are within this zone. For instance, the point of change in curve B might be moved to the other side of the 50 lb. pressure point, rather than be where it is shown.

The next feature that I have discovered is what I have termed the characteristic accuracy of the device. This is the accuracy of the device in maintaining a predetermined temperature during use and is largely determined or may be restricted by a choice of parameters. Specifically it may be the difference in degrees between the operating point and the upper limits of the characteristic temperature differential when the hot water is very hot. Its effect is that if either supply is at a higher pressure than the other this will cause the output to vary within the characteristic accuracy of the device. In the case of Fig. 15 it will be seen that the output of the device with a decrease in cold water pressure will vary 28° higher than the temperature (82°) for which the device was set. Therefore, the characteristic accuracy as shown by this device is 28°.

Heretofore it was thought that the best regulation with a device of this character would be obtained by maintaining equal pressures of hot and cold water. But I have discovered that if unequal pressures are maintained the first step of an improved performance is realized because with unequal pressure I immediately (a) eliminate one-half of the undesirable effects of the characteristic temperature differential, and (b) reduce the region of instability to zero. Therefore, I deliberately provided pressure regulators where a difference in pressure can always be maintained regardless of water pressure, assuming, of course, that there is always sufficient pressure in the lines to enable a differential to be maintained; obviously if the line pressure dropped below the maximum pressure to which the regulator was set no such difference could be maintained.

Fig. 16 shows a curve depicting the operation of the thermostat of my invention. It will be noticed that because of my construction, where there are no sliding parts and no lost motion, that the characteristic temperature differential is only 10°. Another important feature will be noted and that is that the differential occurs mainly on the side where the hot water pressure is less than the cold and that on the cold side where the cold water pressure is less than the hot the temperature is maintained within one-half a degree regardless of flow. Therefore, the characteristic accuracy is one-half a degree. By selecting a pressure differential where the hot water pressure exceeds the cold I have extreme accuracy, since I eliminate all of the characteristics on the other end of the curve.

I chose to have the hot water pressure greater than the cold because it is possible to have the hot water a greater number of degrees hotter than the desired temperature than the cold below the desired temperature. This is because of my discovery that in an unbalanced device the characteristic accuracy is always higher (less degrees) when the highest pressure water differs farthest from the output temperature. This is because if the water is extremely hot it only takes a very small amount of hot water to properly temper the cold water. When the hot water has a higher temperature it is only necessary to open the hot water valve a very small amount. For instance, if the hot water was so hot that the valve was just cracked only a very small amount of hot water could be added to the stream. Opening the hot water valve a very small amount would mean that the increase in hot water would be many times the volume than when the valve was cracked. At the same time the amount of closing the cold water valve because of the large volume flow would be proportionately small. Therefore, the slightest change of the thermostat would reflect an exceedingly large change in the flow of hot water and practically no change in the cold water. For this reason the sensitivity of the device is greater and greater accuracy will be had, and the output can be retained constant within a very small range in temperature.

Curve E of Fig. 16 shows the results when the regulators are used which maintained the above mentioned pressure difference. It will be seen as soon as the hot water had enough pressure (approximately 10 lbs.) to cause it to equal the pressure of cold (regulated at 10 lbs.) that the output temperature rises to within one-half a degree of the desired temperature and is thus maintained until the flow stops because the hot water valve closes and there is no cold water pressure.

As previously mentioned I also contemplate a device wherein should the cold water temperature rise, as it sometimes does during the summer months, to such a temperature that it would not be cold enough to maintain the water output at the desired temperature of say 68°, I can supply ice water to provide the desired reduction in temperature. This device contemplates a completely automatic operation. That is, when the normal cold water supply is cold enough to provide the desired temperature output the normal cold water supply will be used; should the temperature of the cold water rise the device automatically shifts over to water from an ice water supply. This apparatus contemplates assembling the apparatus of Fig 1 in combination with another thermostatic unit and an additional pressure regulator.

Summarizing first the flow of hot and cold water through the three-element unit, it is to be noted that the hot water enters the base housing 31 through the inlet 32 and that the cold water enters the housing 31c through the inlet 32c. The hot water travels through the duct 33 after which the unit exercises its pressure reduction function, subsequently, it is discharged via duct 46 into duct 105 of the thermostat housing 107. The cold water likewise passes into duct 33c and thence into the regulator where its pressure is reduced, in this case to a lower pressure than that of the hot water. Subsequently, it is discharged from the unit 46a into the duct 106 of the thermostat. In the thermostat the hot and cold water is mixed and eventually discharged at the desired temperature from the outlet 150.

Referring now to Fig. 19 wherein I have provided, not only the elements as shown in Fig. 2 but, an additional thermostat and a regulator for ice water. This device comprises, reading from left to right, the hot water pressure regulator, the first thermostatic unit, the cold water pressure regulator, a second thermostatic unit and finally on the extreme right an ice water pressure regulator. It being assumed that it is desired to regulate the temperature of the water output from the apparatus at 68°, and that the temperature of the cold water to start with, is at 58° or some temperature below 68°. Hot water and cold water enter into thermostat I which regulates the temperature of the output to 68° exactly as just described for the previous embodiment, the only difference being that the output from thermostat I, instead of being from 150 and being piped directly to the place of use, flows through the base of the cold water regulator into thermostat II and is discharged from this thermostat to a line which connects to the point of use. During the period when the normal cold water supply is below the desired temperature thermostat I is operating to regulate the temperature of the output water and thermostat II is operative only to keep the ice water valve closed as will hereinafter more clearly appear.

At this point it should be noted that although the flow through the thermostat I and regulators is fundamentally the same, specifically the ducts and ports are rearranged to permit their combination with the additional units. This rearrangement merely entails selecting other of the ducts for the travel of the fluid. This can readily be accomplished for as can be seen from Figs 6 and 7 the ducts which extend vertically through the walls of the valve housing are symmetrically arranged about the valve housing and since each is divided by a partition such as is shown at 51 in Fig. 8, it is only necessary to rotate the member to the desired position and drill holes in the proper partitions to provide for flow through different parts of the housing. However, the principles of the flow through the various units are the same.

The manner of changing the path of the water flow through the apparatus is best understood by comparing the diagrammatic view of Fig. 19 with that of Fig. 2.

It will be noted that the flow from the hot water pressure regulator 31 (Fig. 2) instead of being through the duct 46 in the lower right side has been changed (Fig. 19) so that the outlet flow is through the upper right side at 215 into thermostat I at 216. It should also be observed that the flow from the cold water pressure regulator to thermostat I instead of being from duct 46a on the lower left hand side has likewise been changed so it is from the duct 217 on the upper left hand side into 218.

The discharge from thermostat I instead of being at 150 as in Fig. 2 is directed from the lower right 106b as viewed in Fig. 19 into duct 46c and through the base of the cold water pressure regulator via duct 219 into thermostat II at 105c. So far as thermostat II and the ice water regulator are concerned the flow through these two units is exactly like that described for thermostat and cold water regulation of the three-unit device in the first embodiment, and it should be considered for certain conditions that the three units on the left are the same as only one hot water unit in contemplating the flow through thermostat II and the ice water pressure regulator.

At this point it should help the understanding of the invention to state that so long as the normal cold water supply is cold enough to afford regulation (in this instance lower than 68°), the three units on the left operate and the only effect that thermostat II has on the system is that the regulated water flows through thermostat II. In other words, it could be left off so far as operation at this time is concerned. As soon, however, as the temperature of the regular cold water supply rises above 68° the three elements on the left cease to regulate as to temperature and regulate as to pressure only and thermostat II and the ice water pressure regulator come into operation to reduce the temperature of the water output to 68°.

As previously stated, for normal regulation the hot water has to be at a higher temperature than the output and the higher this temperature the greater the accuracy of the device, and the cold water has to be at a temperature lower than the output; and that if the hot water temperature falls below that of the desired output or the cold water temperature rises above that of the desired output, regulation ceases.

It will now be assumed that the cold water temperature which was originally at 58° gradually rises due to conditions beyond normal control until it reaches a temperature above the stabilized temperature of 68°. At this time the hot water will be completely shut off by thermostat I since it is operating on the upper limits of the characteristic temperature differential. The cold water valve will be wide open and full flow of the cold water will occur through the thermostat I. This water may now be considered as a hot or warm water supply, since it is now at a temperature higher than 68°.

Here again I utilize an important feature of my discovery by causing thermostat II to operate on the lower side of the characteristic temperature differential. This affords better regulation of temperature because it is not now possible to maintain the hot water at a temperature difference sufficiently hotter than the desired temperature, because the normal hot water supply is shut off by thermostat I and the hot water for the apparatus is now being supplied by the normal cold water supply, the temperature of which has risen above 68°.

At this time thermostat II takes over the regulation and ice water from the ice water pressure regulator is admitted to thermostat II where it is mixed with the warm "cold" water.

It will be remembered as previously pointed out, that the three units to the left were arranged so that the pressure for the cold water was lower than the pressure of the hot water. This being the controlling feature which eliminates the regions of instability and causes the unit during normal operation to operate with a very high degree of accuracy.

Now that the normal "cold" water supply has become so hot as to be usable as the hot water supply, and because this heat cannot be readily controlled it becomes desirable to cause the ice water to have the greatest difference in temperature from the output, and to thus shift the operation to the lower side of the characteristic temperature differential and to maintain the ice water at higher pressure to eliminate the region of instability. To do this I cause the ice water regulator unit to deliver water to thermostat II at a higher pressure than that of the cold water unit.

It will also be remembered that it was stated in connection with the operation of the first embodiment that the hot water valve in thermostat I was nearly closed and hence the regulating power of the hot water was greater for a smaller amount of thermostatic element movement. In the operation now being described the situaton is just the opposite. The cold water pressure is highest and the ice water valve is nearly closed and a slight change in the thermostat will make the greatest change in the volume of ice water into the device. This may also be looked at from another angle which may be helpful in considering the operation. That is, in the first instance during normal operation it can be considered as a stream of cold water which is brought up to temperature by inserting a small amount of hot water, and in the second case it is a stream of warm water which is cooled by inserting a small amount of cold water. In the first case the water is so hot and at such high pressure that only a small amount is needed and in the second case the ice water is so cold and the pressure so high that only a small amount is needed.

It will thus be seen that I have provided a device which provides for accurate control of temperature under widely varying conditions of the supply water and that I am able to maintain a temperature output of the device under varying conditions of demand within closer limits of the desired output than has heretofore been practical because of my discovery of the new method of operation and the improved apparatus for carrying out that method of operation.

It has also been shown how, by improved structure, I am able to design a small number of parts, which by a few simple machining operation such as may be performed on a drill press, adapt the parts to facilitate carrying out the different modifications of the invention.

Having thus described my invention, I am aware that new and numerous departures may be made therefrom, but without departing from the scope of the appended claims.

I claim:

1. A thermostatic water regulator of the class described including a housing formed with a cold water inlet chamber and a hot water inlet chamber, a pair of valves for controlling the flow of fluid out of said chambers, rod means extending through said chambers and rigidly connecting said valves to each other and resilient means connected to said rod and said housing for sealing said chambers from each other, a mixing chamber, said housing formed with a duct for conducting the cold water discharging from the cold water chamber to said mixing chamber said duct opening in the side of said chamber, said hot water chamber being disposed to discharge water controlled by said valve directly to said mixing chamber, baffle means in said mixing chamber for cooperation with the fluid flow into said chamber to mix the fluids in said chamber and comprising a downwardly extending member for diverting the hot water stream, said baffle formed with an outlet port for the discharge of fluid from said chamber, and thermo responsive means disposed in the path of fluid from said mixing chamber and comprising a tank having a fluid therein, a bellows disposed in one end of said tank and a member having one end connected to and carried by said bellows and the other end connected to said rod and extending through the mixing chamber for controlling said valves, said bellows being disposed in the path of flow or fluid from said mixing chamber, and baffle means carried by said bellows and rod connecting member, disposed in the path of said fluid and adapted to be moved by the fluid proportional to the flow thereof to compensate for the loss of pressure in the bellows during such fluid flow.

2. A thermostatic regulator including a housing formed to provide a hot water chamber and a cold water chamber with a partition for separating said chambers and formed with a central opening therethrough, said chambers being formed with valve ports opening from said chambers at their opposite extremities, valves for controlling the flow of fluid from said chambers through said ports, means for connecting said valves rigidly together to provide for simultaneous movement thereof, flexible means connected to said partition and valve connector to seal said chambers from each other, said housing formed to provide a mixing chamber in alignment with and juxtaposed to said hot water chamber and said hot water valve opening thereinto, an extension for said valve connector extending through the mixing chamber, a water guide closing the end of the mixing chamber and provided with a baffle for influencing the mixing of fluids in the chamber and formed with an opening providing a discharge for the mixing chamber, said valve connector extending through the opening into the water guide, said water guide extending upward in said housing in spaced relation to the wall thereof, a closure for the upper end of said housing and a thermostat tank suspended therefrom and extending downward in said water guide; fluid pressure responsive means for said tank including a flexible member, a movable member carried by the flexible member and including a head, a stem extending from the head and connected to the valve connector, spring means connected to said closure and said head and holding said movable member under tension, and a fluid material responsive to heat filling said tank, said fluid expansion adapted to move said movable member and said movable member to move said valve connector to close the hot water valve and open the cold water valve.

3. A thermostatic regulator including a housing formed to provide an upper hot water chamber and a lower cold water chamber, a partition for separating said chambers formed with a central opening therein, said chambers being provided with valve ports opening from said chambers at their opposite extremities, valves disposed in said ports for controlling the flow of fluid therethrough, rod means for connecting said valves rigidly together to provide for simultaneous operation thereof, flexible means connected to said partition and valve rod to seal said chambers from each other, spring means seated on said partition and in engagement with the hot water valve to bias the hot water valve to an open position and the cold water valve to a closed position; a second housing superimposed on the valve chamber housing and formed to provide a mixing chamber in alignment with and juxtaposed to said hot water chamber, said hot water valve opening into the mixing chamber, an extension for said valve rod extending through the mixing chamber, a water guide superimposed on and closing said mixing chamber and provided with a baffle for influencing the mixing of fluids in the chamber and formed with a central opening providing a discharge port for the mixing chamber, said valve rod extending through the central opening into the water guide and formed with a socket at its end, said water guide extending upward and a housing surrounding said guide in spaced relation thereto, a closure for the upper end of said housing and a thermostat tank suspended therefrom and extending downward in said water guide to a point spaced from the outlet of the mixing chamber; fluid pressure responsive means for said tank comprising a bellows secured around an opening in the tank and extending upwardly into the tank, a movable member carried by the upper end of the bellows and including a head sealed to the end of the bellows and a stem extending from the head and seated in said socket of the valve rod, spring means connected to said closure and said head and holding said movable member and bellows under tension, and a fluid expansion material responsive to heat filling said tank, said fluid upon expansion adapted to move said movable member and said movable member to move said valve rod to close the hot water valve and open the cold water valve.

4. The method of providing a constant temperature of water or the like under varying conditions of temperature of hot and cold water supplies with a thermostatic regulator having a predetermined characteristic temperature differential, which comprises supplying hot, cold and ice water to the regulator, utilizing the hot and cold water supplies when the cold water is at a temperature colder than the desired temperature while maintaining a higher pressure of the hot water supply to eliminate the region of instability of the thermostat and operate on the upper limit of the characteristic temperature differential, and when the temperature of the cold water is above the desired temperature utilizing the cold water as the source of hot water supply and the ice water at the source of cold water supply and maintaining a higher pressure on the ice water supply to reduce the region of instability and shift the operation of the thermostat from the upper limit of the characteristic temperature differential and the desired temperature to the lower limit of the characteristic temperature differential and the desired temperature.

JOHN A. VICTOREEN.

REFERENCES CITED

The following references are of record in the file of this patent:

UNITED STATES PATENTS

| Number | Name | Date |
| --- | --- | --- |
| 48,120 | Warner | June 6, 1865 |
| 1,195,722 | Powers | Aug. 22, 1916 |
| 1,391,633 | Hazelton | Sept. 20, 1921 |
| 1,526,248 | Small | Feb. 10, 1925 |
| 1,536,461 | Wadsworth | May 5, 1925 |
| 1,801,094 | Lawler | Apr. 14, 1931 |
| 1,942,269 | Davies | Jan. 2, 1934 |
| 1,942,270 | Resek | Jan. 2, 1934 |
| 2,053,974 | Smith | Sept. 8, 1936 |
| 2,100,037 | Sandvoss | Nov. 23, 1937 |
| 2,107,200 | Kennon | Feb. 1, 1938 |
| 2,145,115 | Hoopes | Jan. 24, 1939 |
| 2,205,334 | Barnes | June 18, 1940 |
| 2,250,815 | Ruegg | July 29, 1941 |
| 2,279,236 | Hoopes | Apr. 7, 1942 |
| 2,317,717 | Bauman | Apr. 27, 1943 |
| 2,335,761 | Hultman | Nov. 30, 1943 |

FOREIGN PATENTS

| Number | Country | Date |
| --- | --- | --- |
| 834,361 | France | Aug. 16, 1938 |